(12) United States Patent
Perozo (10) Patent No.: US 7,730,344 B1
(45) Date of Patent: Jun. 1, 2010

(54) SYSTEM AND METHOD FOR ERROR CORRECTION

(75) Inventor: Angel G. Perozo, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 659 days.

(21) Appl. No.: 11/511,131

(22) Filed: Aug. 28, 2006

(51) Int. Cl.
*G06F 11/00* (2006.01)
(52) U.S. Cl. ......................................... 714/6
(58) Field of Classification Search ........ 714/6, 714/25, 27, 30, 32, 37, 45, 48, 52, 758, 768
See application file for complete search history.

(56) References Cited

U.S. PATENT DOCUMENTS

| 5,383,204 | A | * | 1/1995 | Gibbs et al. ............ 714/758 |
| 5,553,302 | A | * | 9/1996 | Morrissey et al. ........... 710/5 |
| 6,438,724 | B1 | * | 8/2002 | Cox et al. ................ 714/758 |
| 6,446,234 | B1 | * | 9/2002 | Cox et al. ................ 714/758 |
| 6,728,855 | B2 | * | 4/2004 | Thiesfeld et al. .......... 711/170 |
| 7,171,591 | B2 | * | 1/2007 | Chen ....................... 714/52 |
| 2003/0093633 | A1 | * | 5/2003 | Thiesfeld et al. .......... 711/154 |
| 2005/0188292 | A1 | * | 8/2005 | Chen ...................... 714/768 |
| 2006/0168494 | A1 | * | 7/2006 | Trainin ................... 714/758 |
| 2006/0195768 | A1 | * | 8/2006 | Hassner et al. ............ 714/781 |
| 2007/0043997 | A1 | * | 2/2007 | Yang et al. ............... 714/758 |

\* cited by examiner

*Primary Examiner*—Nadeem Iqbal (57) ABSTRACT

An error correction system for a data storage device comprises a direct access module and a buffer control module. The direct access module receives a data stream that includes a plurality of data words from a host, generates data integrity information based on the plurality of data words, and inserts the data integrity information into the data stream. The buffer control module receives the data stream and stores the data stream to a memory.

57 Claims, 9 Drawing Sheets

SYSTEM AND METHOD FOR ERROR CORRECTION

FIELD

The present disclosure relates generally to storage device controllers, and more particularly to efficient error correction systems for storage device controllers.

BACKGROUND

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

A hard disk controller (HDC) communicates with the storage device and the host system. The HDC manages interaction between the storage device and the host system. Communication between the host system and the HDC is usually provided using one of a variety of standard I/O bus interfaces. Typically, when data is read from a storage device, a host system sends a read command to the HDC, which stores the read command into a buffer memory. Data is read from the storage device and stored in the buffer memory.

A conventional controller stores data bytes on the storage device in sets of a predetermined length. The HDC or a host may generate error correction code (ECC) bytes and cyclic redundancy checks (CRC) bytes for each set of data bytes. For example, the host may generate data bytes, and the HDC may generate a distinct set of CRC and/or ECC bytes. CRC and ECC information is used to reliably recover the data bytes from the storage device. Typically, CRC and/or ECC bytes are computed when data bytes are transmitted from the HDC to the storage device. The CRC and the ECC bytes are appended to the end of the set of data bytes. The data bytes, ECC bytes, and/or CRC bytes constitute a sector of data that is stored to the storage device.

Errors can occur when data bytes are transmitted from the HDC and stored to the storage device. An ECC module detects and corrects errors in the sector as the sector is read from the storage device.

SUMMARY

An error correction system for a data storage device comprises a direct access module and a buffer control module. The direct access module receives a data stream that includes a plurality of data words from a host, generates data integrity information based on the plurality of data words, and inserts the data integrity information into the data stream. The buffer control module receives the data stream and stores the data stream to a memory.

In other features, the direct access module generates the data integrity information for at least one of the data words.

In other features, the direct access module receives the plurality of data words from the host when the host asserts at least one of a plurality of control signals. The plurality of control signals includes at least one of a host request signal, an address signal, a data signal, a write signal, and a host masking signal.

In other features, the direct access module selectively operates in at least one of an activated mode and a deactivated mode. The direct access module generates the data integrity information based on the plurality of data words and inserts the data integrity information into the data stream when the direct access module operates in the activated mode. The direct access module receives the plurality of data words from the host and transmits the plurality of data words to the buffer control module when the direct access module operates in the deactivated mode.

In other features, the direct access module receives the data stream previously stored in the memory from the buffer control module and checks for one or more errors in the data stream based on the data integrity information. The direct access module corrects at least one of the one or more errors and transmits a corrected error signal to the host. The direct access module determines at least one of the one or more errors is uncorrectable and transmits an uncorrectable error signal to the host. The direct access module transmits at least one of the data words corresponding to the at least one of the one or more errors to the host. The direct access module receives the data stream from the buffer control module when the host asserts at least one of a plurality of control signals. The plurality of control signals includes at least one of a host request signal, an address signal, and a host masking signal. The direct access module removes the data integrity information from the data stream and transmits the data stream to the host. The direct access module transmits the data stream to the host.

In other features, the data integrity information is at least one of an error correction code (ECC) and a cyclic redundancy check (CRC).

In other features, the memory is a buffer that temporarily stores the data stream, the data stream to be subsequently transmitted between the buffer control module and a storage device. A data integrity module receives the data stream from the buffer, generates second data integrity information based on the data stream, and inserts the second data integrity information into the data stream. The data stream includes the second date integrity information. The data stream is transferred to said storage device.

In other features, a hard disk drive includes the error correction system.

An error correction system for a data storage device comprises direct access means for receiving a data stream that includes a plurality of data words from a host, for generating data integrity information based on the plurality of data words, and for inserting the data integrity information into the data stream and buffer control means for receiving the data stream and storing the data stream to a memory means.

In other features, the direct access means generates the data integrity information for at least one of the data words.

In other features, the direct access means receives the plurality of data words from the host when the host asserts at least one of a plurality of control signals. The plurality of control signals includes at least one of a host request signal, an address signal, a data signal, a write signal, and a host masking signal.

In other features, the direct access means selectively operates in at least one of an activated mode and a deactivated mode. The direct access means generates the data integrity information based on the plurality of data words and inserts the data integrity information into the data stream when the direct access means operates in the activated mode. The direct access means receives the plurality of data words from the host and transmits the plurality of data words to the buffer control means when the direct access means operates in the deactivated mode.

In other features, the direct access means receives the data stream previously stored in the memory means from the buffer control means and checks for one or more errors in the data stream based on the data integrity information. The direct access means corrects at least one of the one or more errors and transmits a corrected error signal to the host. The direct access means determines at least one of the one or more errors is uncorrectable and transmits an uncorrectable error signal to the host. The direct access means transmits at least one of the data words corresponding to the at least one of the one or more errors to the host. The direct access means receives the data stream from the buffer control means when the host asserts at least one of a plurality of control signals. The plurality of control signals includes at least one of a host request signal, an address signal, and a host masking signal. The direct access means removes the data integrity information from the data stream and transmits the data stream to the host. The direct access means transmits the data stream to the host.

In other features, the data integrity information is at least one of an error correction code (ECC) and a cyclic redundancy check (CRC).

In other features, the memory means temporarily stores the data stream, the data stream to be subsequently transmitted between the buffer control means and a storage device means.

In other features, the error correction system further comprises data integrity means for receiving the data stream from the buffer means, for generating second data integrity information based on the data stream, and for inserting the second data integrity information into the data stream, wherein the data stream including the second date integrity information is transferred to the storage device means.

In other features, a hard disk drive includes the error correction system.

An error correction method for a data storage device comprises receiving a data stream that includes a plurality of data words from a host, generating data integrity information based on the plurality of data words, inserting the data integrity information into the data stream, transmitting said data stream to a buffer control module and storing the data stream to a buffer memory.

In other features, the error correction method further comprises generating the data integrity information for at least one of the data words.

In other features, the error correction method further comprises receiving the plurality of data words from the host when the host asserts at least one of a plurality of control signals. The plurality of control signals includes at least one of a host request signal, an address signal, a data signal, a write signal, and a host masking signal.

In other features, the error correction method further comprises receiving a data stream that includes a plurality of data words from a host, generating data integrity information based on the plurality of data words, inserting the data integrity information into the data stream, and transmitting said data stream to said buffer control module based on operating in at least one of an activated mode and a deactivated mode. The error correction method further comprises generating the data integrity information based on the plurality of data words and inserting the data integrity information into the data stream when operating in the activated mode. The error correction method further comprises receiving the plurality of data words from the host and transmitting the plurality of data words to the buffer control module when operating in the deactivated mode.

In other features, the error correction method further comprises receiving the data stream previously stored in the memory and checking for one or more errors in the data stream based on the data integrity information. The error correction method further comprises correcting at least one of the one or more errors and transmitting a corrected error signal to the host. The error correction method further comprises determining that at least one of the one or more errors is uncorrectable and transmitting an uncorrectable error signal to the host. The error correction method further comprises transmitting at least one of the data words corresponding to the at least one of the one or more errors to the host. The error correction method further comprises receiving the data stream when the host asserts at least one of a plurality of control signals. The plurality of control signals includes at least one of a host request signal, an address signal, and a host masking signal. The error correction method further comprises removing the data integrity information from the data stream and transmitting the data stream to the host. The error correction method further comprises transmitting the data stream to the host.

In other features, the data integrity information is at least one of an error correction code (ECC) and a cyclic redundancy check (CRC).

In other features, the buffer memory is a buffer that temporarily stores the data stream, the data stream to be subsequently transmitted to a storage device. The error correction method further comprises receiving the data stream from the buffer, generating second data integrity information based on the data stream, and inserting the second data integrity information into the data stream, the data stream including the second date integrity information is transferred to the storage device.

In other features, a hard disk drive includes the error correction method.

A computer program stored for use by a processor for operating an error detection system in a storage device comprises receiving a data stream that includes a plurality of data words from a host, generating data integrity information based on the plurality of data words, inserting the data integrity information into the data stream, transmitting said data stream to a buffer control module and storing the data stream to a buffer memory.

In other features, the computer program further comprises generating the data integrity information for at least one of the data words.

In other features, the computer program further comprises receiving the plurality of data words from the host when the host asserts at least one of a plurality of control signals. The plurality of control signals includes at least one of a host request signal, an address signal, a data signal, a write signal, and a host masking signal.

In other features, the computer program further comprises receiving a data stream that includes a plurality of data words from a host, generating data integrity information based on the plurality of data words, inserting the data integrity information into the data stream, and transmitting said data stream to said buffer control module based on operating in at least one of an activated mode and a deactivated mode. The computer program further comprises generating the data integrity information based on the plurality of data words and inserting the data integrity information into the data stream when operating in the activated mode. The computer program further comprises receiving the plurality of data words from the host and transmitting the plurality of data words to the buffer control module when operating in the deactivated mode.

In other features, the computer program further comprises receiving the data stream previously stored in the memory and checking for one or more errors in the data stream based on the data integrity information. The computer program further comprises correcting at least one of the one or more errors and transmitting a corrected error signal to the host. The computer program further comprises determining that at least one of the one or more errors is uncorrectable and transmitting an uncorrectable error signal to the host. The computer program further comprises transmitting at least one of the data words corresponding to the at least one of the one or more errors to the host. The computer program further comprises receiving the data stream when the host asserts at least one of a plurality of control signals. The plurality of control signals includes at least one of a host request signal, an address signal, and a host masking signal. The computer program further comprises removing the data integrity information from the data stream and transmitting the data stream to the host. The computer program further comprises transmitting the data stream to the host.

In other features, the data integrity information is at least one of an error correction code (ECC) and a cyclic redundancy check (CRC).

In other features, the buffer memory is a buffer that temporarily stores the data stream, the data stream to be subsequently transmitted to a storage device. The computer program further comprises receiving the data stream from the buffer, generating second data integrity information based on the data stream, and inserting the second data integrity information into the data stream, the data stream including the second date integrity information is transferred to the storage device.

In other features, a hard disk drive includes the computer program.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

In conventional storage systems, communication errors (e.g. data corruption) can arise in the communication path of the host and the controller resulting in costly interrupts to the operation of the storage system. A host port bus master (HPBM) direct access module according to the present disclosure enables uninterrupted operation of an HDD system.

Figure 1:
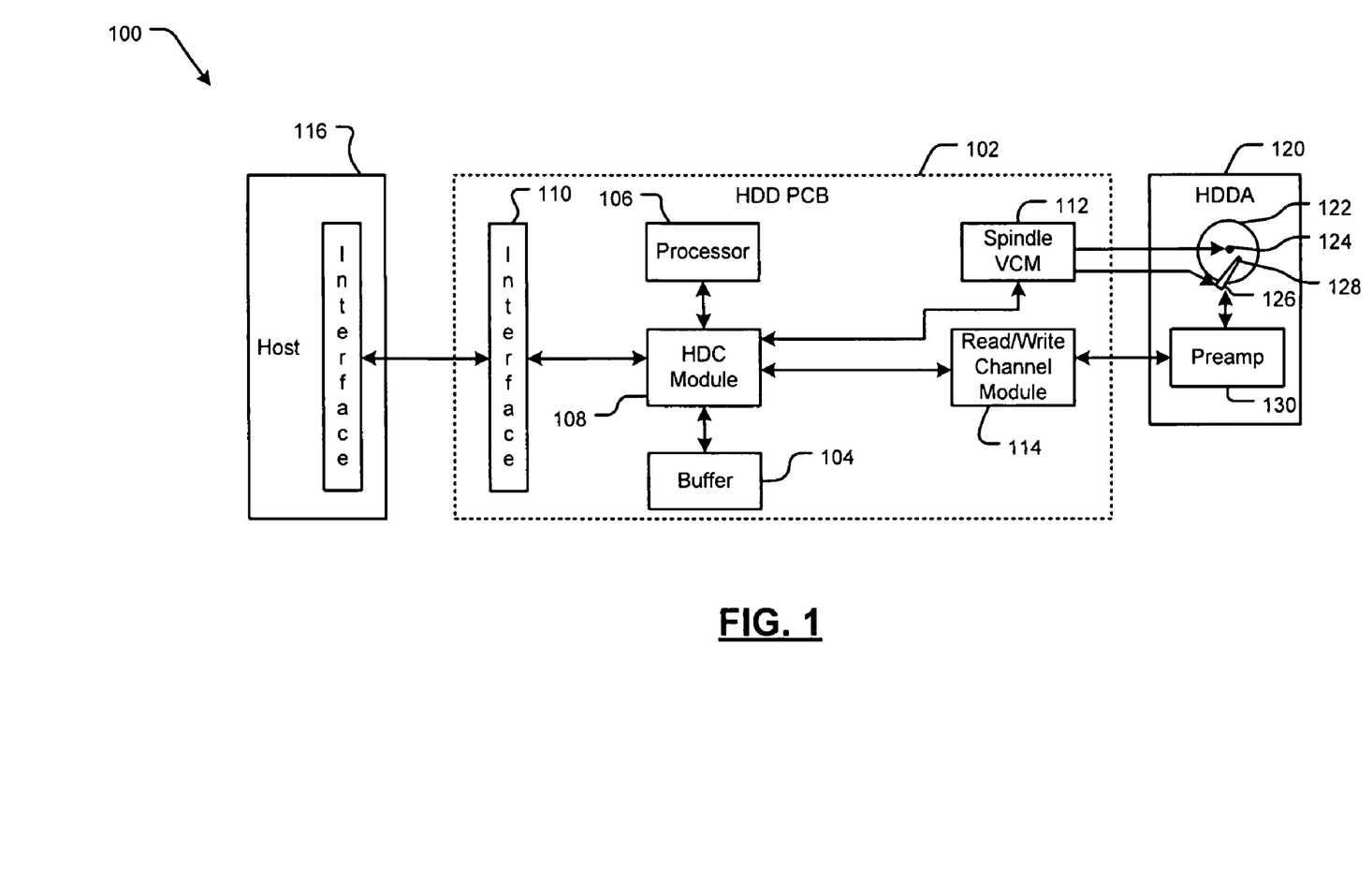
FIG. 1 is a functional block diagram of a hard disk drive (HDD) system according to the present disclosure.

Referring now to FIG. 1, an exemplary hard disk drive (HDD) system 100 that implements the error correction system is shown to include a HDD printed circuit board (PCB) 102. A memory module such as buffer 104 stores read, write and/or volatile control data that is associated the control of the HDD system 100. The buffer 104 usually employs volatile memory having low latency. For example, SDRAM, double data rate (DDR), or other types of low latency memory may be used. Nonvolatile memory such as flash memory may also be provided to store critical data such as nonvolatile control code.

A processor 106 arranged on the HDD PCB 102 performs data and/or control processing that is related to the operation of the HDD system 100. A hard disk control (HDC) module 108 communicates with an input/output interface 110, with a spindle/voice coil motor (VCM) driver or module 112, and/or a read/write channel module 114. The HDC module 108 coordinates control of the spindle/VCM module 112, the read/write channel module 114, and the processor 106 and data input/output with a host 116 via the interface 110.

A hard disk drive assembly (HDDA) 120 includes one or more hard drive platters 122 that include magnetic coatings that store magnetic fields. The platters 122 are rotated by a spindle motor that is schematically shown at 124. Generally the spindle motor 124 rotates the hard drive platters 122 at a controlled speed during the read/write operations. One or more read/write arms 126 move relative to the platters 122 to read and/or write data to/from the hard drive platters 122. The spindle/VCM module 112 controls the spindle motor 124, which rotates the platters 122. The spindle/VCM module 112 also generates control signals that position the read/write arm 126, for example using a voice coil actuator, a stepper motor or any other suitable actuator.

During write operations, the read/write channel module 114 encodes the data to be written with a read/write device 128. The read/write channel module 114 processes the write signal for reliability and may apply data integrity information, for example, error correction coding (ECC), run length limited coding (RLL), and the like. During read operations, the read/write channel module 114 converts an analog read signal output of the read/write device 128 to a digital read signal. The converted signal is then detected and decoded by known techniques to recover the data that was written on the platters 122.

The read/write device 128 is located near a distal end of the read/write arm 126. The read/write device 128 includes a write element such as an inductor that generates a magnetic field. The read/write device 128 also includes a read element (such as a magneto-resistive (MR) element) that senses the magnetic field on the platters 122. The HDDA 120 includes a preamplifier circuit or module 130 that amplifies the analog read/write signals. When reading data, the preamplifier module 130 amplifies low level signals from the read element and outputs the amplified signal to the read/write channel module 114. While writing data, a write current is generated that flows through the write element of the read/write device 128. The write current is switched to produce a magnetic field having a positive or negative polarity. The positive or negative polarity is stored by the hard drive platters 122 and is used to represent data.

The data is stored on the platters 122 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, the processor 106 and the HDC module 108 may be implemented by a single chip. The spindle/VCM module 112 and/or the read/write channel module 114 may also be implemented by the same chip as the processor 106, the HDC module 108 and/or by additional chips. Alternatively, most of the HDD system 100 other than the HDDA 120 may be implemented as a system on chip (SOC).

Figure 2:
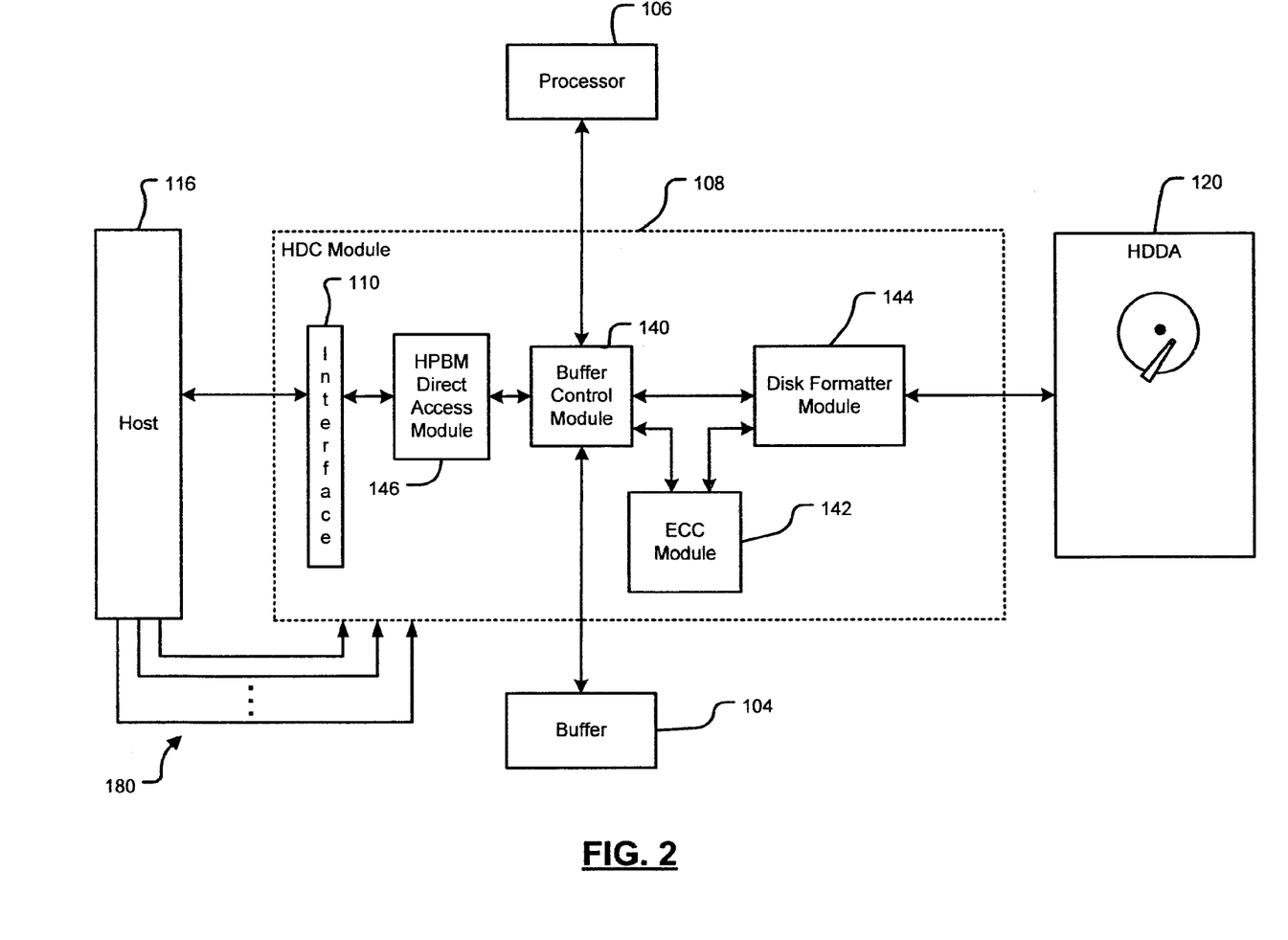
FIG. 2 is a functional block diagram of a hard disk control (HDC) module according to the present disclosure.

Referring now to FIG. 2, the HDC module 108 is shown in more detail. The HDC module 108 implements the error correction system. The HDC module 108 communicates with the buffer 104, the processor 106, the host 116, and the HDDA 120 as described in FIG. 1. The HDC module 108 includes a buffer control module 140, an ECC module 142, a disk formatter module 144, and a HPBM direct access module 146.

The buffer control module 140 (e.g. a direct memory access (DMA) controller) connects the buffer 104 to the disk formatter module 144, the ECC module 142, the host 116, the processor 106, and the HDDA 120. The buffer control module 140 regulates data movement in and out of the buffer 104.

The HPBM direct access module 146 communicates with the host 116 (via the interface 110) and the buffer control module 140. The interface 110 processes frame-based information including, but not limited to, Serial Attached Small (SAS) Computer Interface frames and fiber channel frames received from the host 116. The interface 110 transmits frames received from the host 116 to the HPBM direct access module 146.

The HPBM direct access module 146 implements the error correction system. The HPBM direct access module 146 controls data and/or information communicated from the host 116 to the buffer 104 and/or communicated from the buffer 104 to the host 116. The HPBM direct access module 146 processes data streams received from the host 116. For example, the HPBM direct access module 146 computes data integrity information including, but not limited to, ECC information based on the data input from the host 116 and inserts the ECC information into the data stream. The data stream is stored to the buffer 104 via the buffer control module 140. Conventionally, ECC information is generated when data streams are transmitted from the buffer control module 140 to the platters 122.

In various embodiments, the HPBM direct access module 146 may be implemented by an existing integrated circuit and/or by additional integrated circuits. For example, the buffer control module 140 may include the HPBM direct access module 146. Alternatively, the HPBM direct access module 146 may be implemented as a SOC.

The host 116 sends read and write commands to the HDC module 108. The HDC module 108 stores the read and write commands in the buffer 104. The processor 106 receives the read and write commands from the buffer 104 and executes firmware to control the HDC module 108 accordingly. During read operations, the HDC module 108 reads data corresponding to the read commands from the HDDA 120. The buffer control module 140 and the ECC module 142 receive the data from the HDDA 120. The ECC module 142 provides an ECC mask for errors that may have occurred during read operations while the data is still in the buffer control module 140. After any errors in the data are corrected, the data is transferred to the buffer 104. The data is then transferred from the buffer 104 to the host 116.

During write operations, the disk formatter module 144 controls writing of data to the HDDA 120. The buffer 104 receives data corresponding to the write commands via the HDC module 108. The disk formatter module 144 receives the data from the buffer 104 via the buffer control module 140. The disk formatter module 144 formats the data for writing to the HDDA 120. For example, the disk formatter module 144 adds error correction codes to the data, monitors a position of the read/write device 128, and writes the data to the read/write device 128 as described in FIG. 1.

Figure 3:
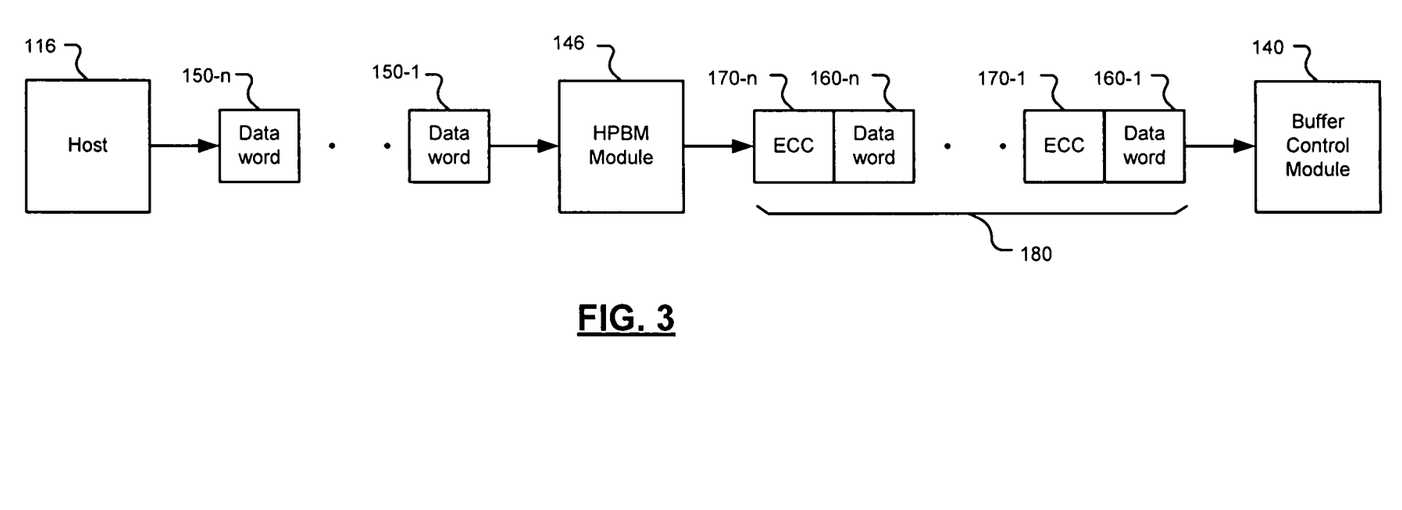
FIG. 3 illustrates a write operation according to the present disclosure.

FIG. 3 illustrates the HPBM direct access module 146 processing data words 150-1 ... 150-*n*, referred to collectively as data words 150, during a write operation to the buffer control module 140. Data words 160-1 ... 160-*n*, referred to collectively as the data words 160, depict data words after processing by the HPBM direct access module 146. Typically, the data words 150 and 160 include a pair of 16 bit data words. However, it is anticipated that the data words 150 and 160 can be of variable size. The HPBM direct access module 146 generates error correction codes (ECC) 170-1 ... 170-*n*, referred to collectively as the ECC 170, based on the data words 150.

In the present implementation, HPBM direct access module 146 inserts the ECC 170 into a burst of data words 150 from the host 116 via the interface 110. The burst input into the HPBM direct access module 146 can begin and/or end on an even and/or odd address. The burst input can be of an odd or even length. The HPBM direct access module 146 simultaneously stores a data stream 180 including the data words 160 and the corresponding ECC 170 to the buffer 104 via the buffer control module 140. In other words, the HPBM direct access module 146 inserts the ECC 170 into the data stream 180 that is transferred from the host 116 to the buffer control module 140.

The HPBM direct access module 146 generates the ECC 170 as data words 150 are transmitted from the interface 110 to the buffer control module 140. In various embodiments, the ECC 170 can be generated for a block of data transmitted from the host 116 to the buffer control module 140. In the present implementation, the ECC 170 includes 32 bits. Those skilled in the art can appreciate that the ECC 170 are not limited to any particular size.

A write operation begins when the host 116 asserts control signals 180. The control signals 180 may include, but are not limited to, a host request (HREQ) signal, an address signal, a data signal, a buffer 104 write signal, and a host masking signal. The HREQ signal indicates the presence of a transfer request from the host 116. The asserted buffer 104 write signal indicates that the transfer request from the host 116 is a write operation to the buffer 104. The address signal designates the location the data is to be written to the buffer 104. The data signal communicates the data words 150 that are to be processed and stored to the buffer 104, and the host masking signal defines a contiguous memory location of the buffer 104 used to store data.

Data words 150 are transferred to the HPBM direct access module 146 on the rising edge of a clock cycle when the HREQ signal is asserted, and the HPBM direct access module 146 receives an acknowledgement signal. The acknowledgement signal indicates that the buffer control module 140 is prepared to accept the transfer of the data stream 180 generated by the HPBM direct access module 146.

Figure 4:
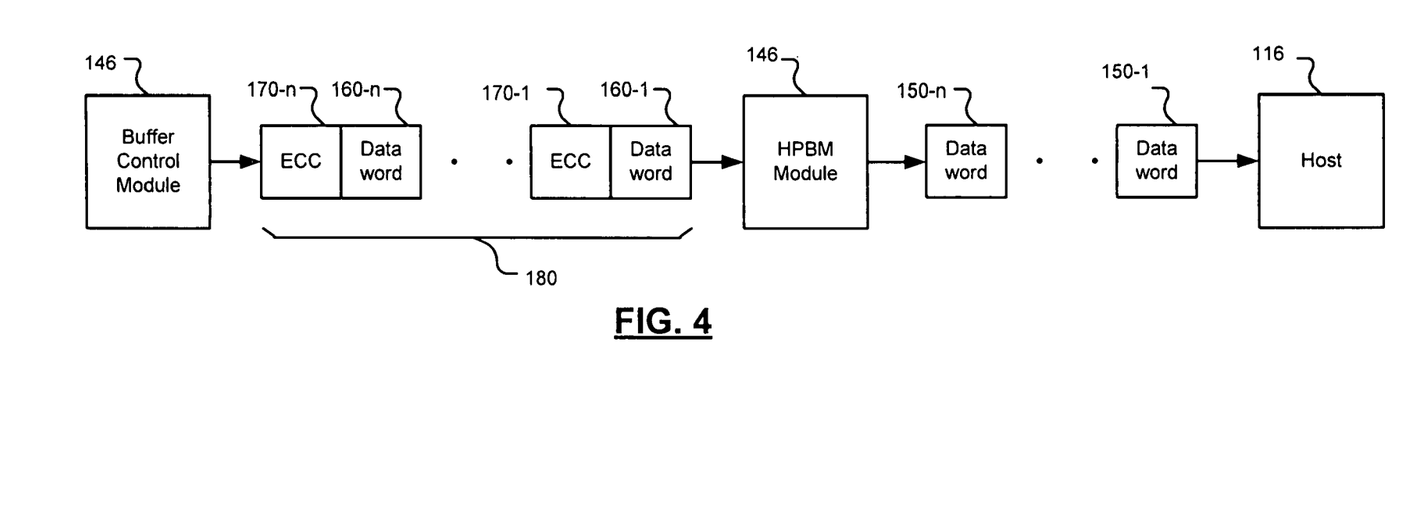
FIG. 4 illustrates a read operation according to the present disclosure.

FIG. 4 illustrates the HPBM direct access module 146 processing the data stream 180 during a read operation from the buffer 104 via the buffer control module 140. The HPBM direct access module 146 processes the data stream 180 stored in the buffer 104. The HPBM direct access module 146 detects and corrects errors (e.g. data corruption) based on information contained within the ECC 170. The HPBM direct access module 146 eliminates errors occurring in transit from the buffer 104 to the host 116, thereby increasing the efficiency of data transmission from the host 116 (via the host interface 110) to the buffer control module 140 and/or from the buffer control module 140 to the host 116. The HPBM direct access module 146 performs error detection and correction, thereby eliminating the need of interrupts to the data flow that decrease performance of the HDD system 100.

During read operations, data is transmitted from the buffer control module 140 to the interface 110. A read operation begins when the interface 110 asserts control signals. The control signals may include, but are not limited to, the HREQ signal, the address signal, and the host masking signal. During the read operation, data words 150 recovered by the HPBM direct access module 146 are transferred to the interface 110 on the rising edge of a clock cycle when the HREQ signal is asserted, and the HPBM direct access module 146 receives the acknowledgement signal. In an exemplary embodiment, the interface 110 and the buffer control module 140 share a common clock (not shown).

Typically, the HPBM direct access module 146 first processes the information contained within each ECC 170 corresponding to each data word 160 and then removes the ECC 170 from the data stream 180 transmitted from the buffer control module 140. However, it is anticipated that the data stream 180 can be transmitted directly to the host 116 via the interface 110.

In an exemplary embodiment, when the HPBM direct access module 146 detects and corrects an error, the HPBM direct access module 146 transmits a corrected error signal to the interface 110. The corrected error signal indicates that the data words 150 have been accurately corrected and recovered by the interface 110. Similarly, when the HPBM direct access module 146 detects the presence of an uncorrectable error, HPBM direct access module 146 transmits an uncorrectable error signal and the corresponding corrupted data words 170 to the host 116. In the present implementation, the HPBM direct access module 146 can be disabled from operation within the HDD system 100 based on information transmitted from the host 116.

Figure 5:
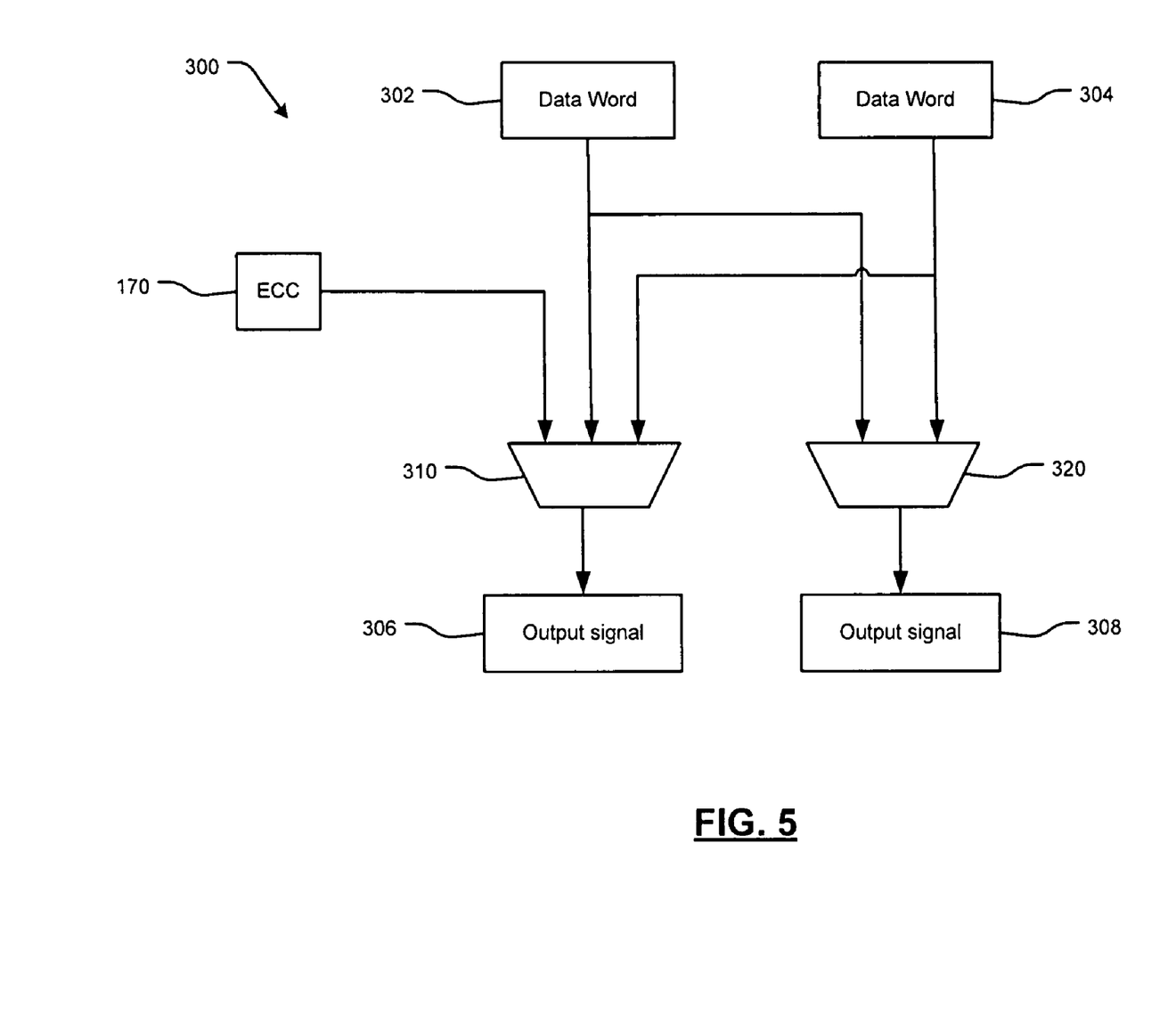
FIG. 5 is a block diagram of an insertion module according to the present disclosure.

FIG. 5 illustrates exemplary insertion logic 300 of the HPBM direct access module 146. The HPBM direct access module 146 can operate in an activated or a deactivated mode. In the activated mode, the HPBM direct access module 146 performs error correction operations and inserts the ECC 170. In the deactivated mode, the HPBM direct access module 146 does not perform the error correction operations. Instead, the HPBM direct access module 146 receives and transmits data from the buffer 104 to the host 116.

The insertion logic 300 includes multiplexers 310 and 320. When the HPBM direct access module 146 is operating in the activated mode, the multiplexer 310 receives the ECC 170, a first data word 302, and a second data word 304. Each of the data words 150 include the first data word 302 and second data word 304. In an exemplary embodiment, first data word 302 and second data word 304 include 32 bits of data. However, those skilled in the art can appreciate that other sizes of the first data word 302 and the second data word 304 may be used. Multiplexer 310 multiplexes the ECC 170, the first data word 302, and the second data word 304 and outputs a first output signal 306 to the buffer control module 140.

When the HPBM direct access module 146 is operating in the deactivated mode, the multiplexer 310 receives the first data word 302 and the second data word 304. Multiplexer 310 multiplexes the first data word 302 and the second data word 304 and outputs a second output signal 308 to the buffer control module 140.

Figure 6:
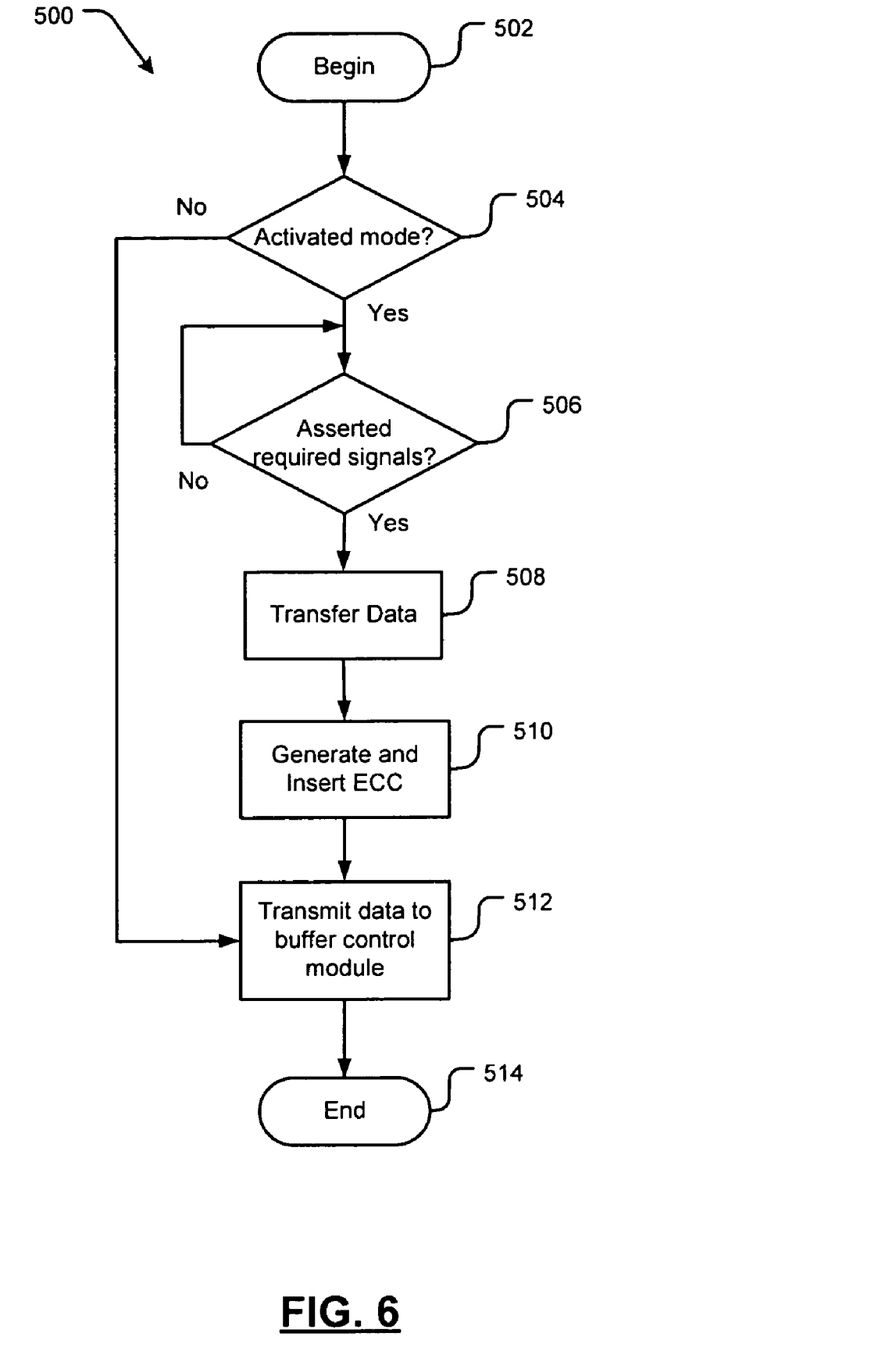
FIG. 6 is a flow diagram for storing data according to the present disclosure.

Referring now to FIG. 6, a method 600 for transmitting data from the host 116 to the buffer control module 140 is shown in more detail. The method 500 begins in step 502. In step 504, the buffer control module 140 determines whether the HPBM direct access module 146 is operating in the activated mode. If the HPBM direct access module 146 is not operating in the activated mode, the HPBM direct access module 146 proceeds to step 512. If the HPBM direct access module 146 is operating in the activated mode, the HPBM direct access module 146 proceeds to step 506. In step 506, the HPBM direct access module 146 determines whether the host 116 (via the interface 110) has asserted the requisite signals discussed above.

If the host 116 has not asserted the requisite signals, the HPBM direct access module 146 returns to step 506. If the host 116 has asserted the requisite signals, the method 500 proceeds in step 508. In step 508, the host 116 transfers the data words 150 to the HPBM direct access module 146. In step 510, the HPBM direct access module 146 generates the ECC 170 based on the data words 150 and inserts the ECC 170 into the data stream 180 following the corresponding data word 160. In step 512, the HPBM direct access module 146 transmits the data stream 180 to the buffer control module 140. The method 500 ends in step 514.

Figure 7:
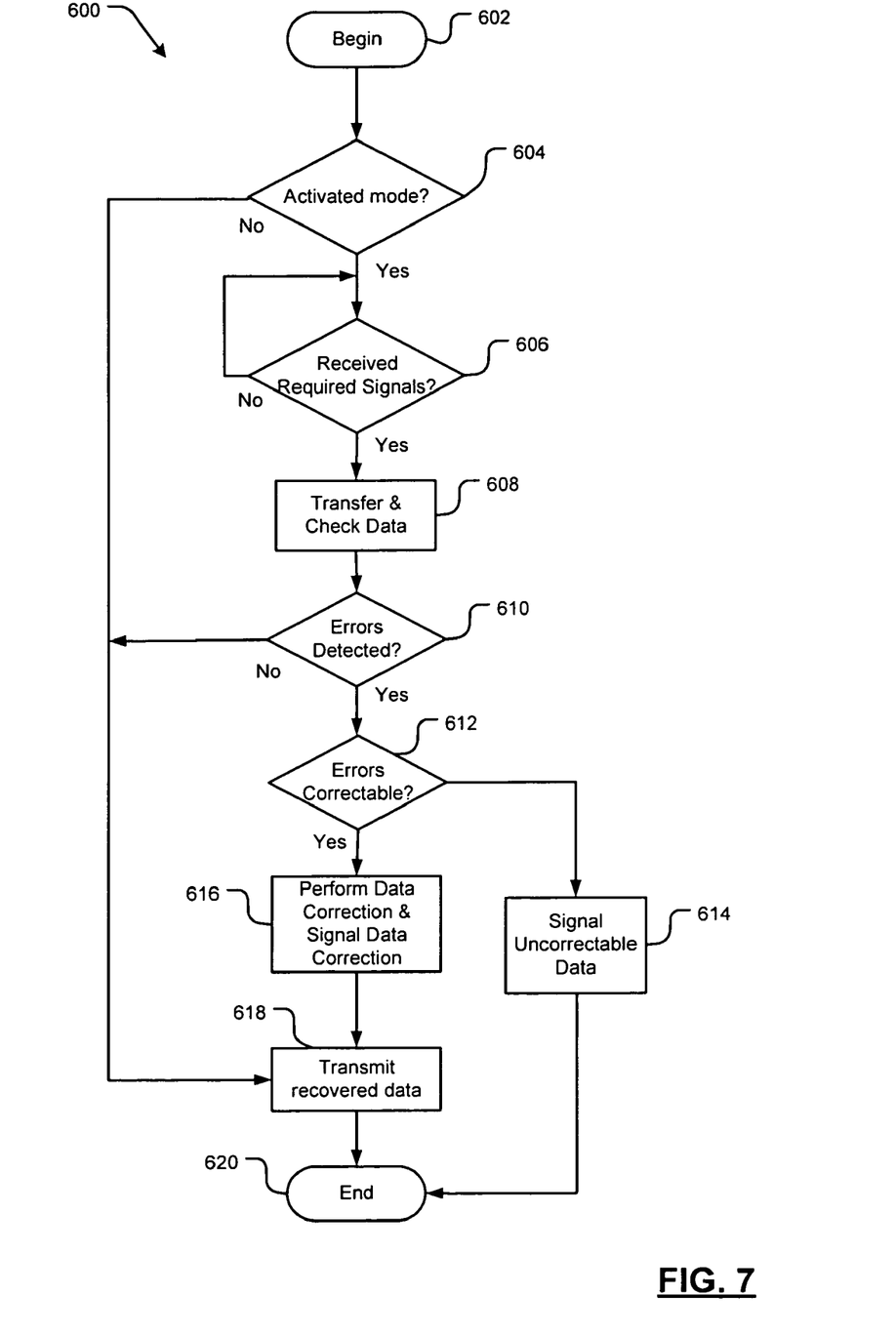
FIG. 7 is a flow diagram for reading data according to the present disclosure.

Referring now to FIG. 7, a method 600 for reading data from the buffer 104 via the buffer control module 140 is shown in more detail. The method 600 begins in step 602. In step 604, the buffer control module 140 determines whether the HPBM direct access module 146 is operating in the activated mode. If the HPBM direct access module 146 is not operating in the activated mode, the HPBM direct access module 146 proceeds in step 618. If the HPBM direct access module 146 is operating in the activated mode, the HPBM direct access module 146 proceeds in step 606. In step 606, the HPBM direct access module 146 determines whether the host 116 has asserted the requisite signals discussed above.

If the host 116 has not asserted the requisite signals, the HPBM direct access module 146 returns to step 606. If the host 116 has asserted the requisite signals, the method 600 proceeds to step 608. In step 608, the buffer control module 140 transfers the data stream 180 to the HPBM direct access module 146, and the HPBM direct access module 146 checks the data stream 180. In step 610, the HPBM direct access module 146 determines if any errors have been detected in the data stream 180. If no errors are detected within the data stream 180, the HPBM direct access module proceeds to step 618. If the HPBM direct access module 146 detects errors, the HPBM direct access module 146 proceeds to step 612.

In step 612, the HPBM direct access module 146 determines whether the errors are correctable. If the errors within the data stream 180 are not correctable, the HPBM direct access module 146 proceeds to step 614. In step 614, the HPBM direct access module 146 transmits an uncorrectable error signal and the corresponding corrupted data words 160 to the host 116. In step 612, if the errors are correctable, the HPBM direct access module 146 proceeds to step 616. In step 616, the HPBM direct access module 146 corrects the errors and transmits a corrected error signal to the host 116. In step 618, the HPBM direct access module 146 transmits the recovered data words 150 to the host 116 (via the interface 110). The method 600 ends in step 620.

Figure 8A:
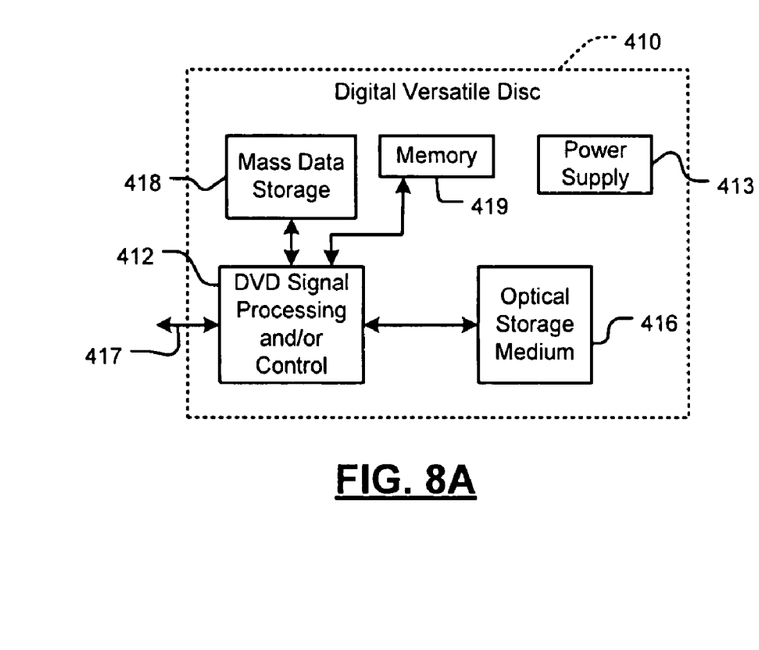
FIG. 8A is a functional block diagram of a digital versatile disk (DVD)

Referring now to FIGS. 8A-8F, various exemplary implementations of the error correction system are shown. As shown in FIG. 8A, the error correction system can be implemented in a digital versatile disc (DVD) drive 410. The DVD drive 410 includes either or both signal processing and/or control circuit, which are generally identified in FIG. 8A at 412, mass data storage 418 and/or a power supply 413. The mass data storage 418 may implement the error correction system. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 1. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Figure 8B:
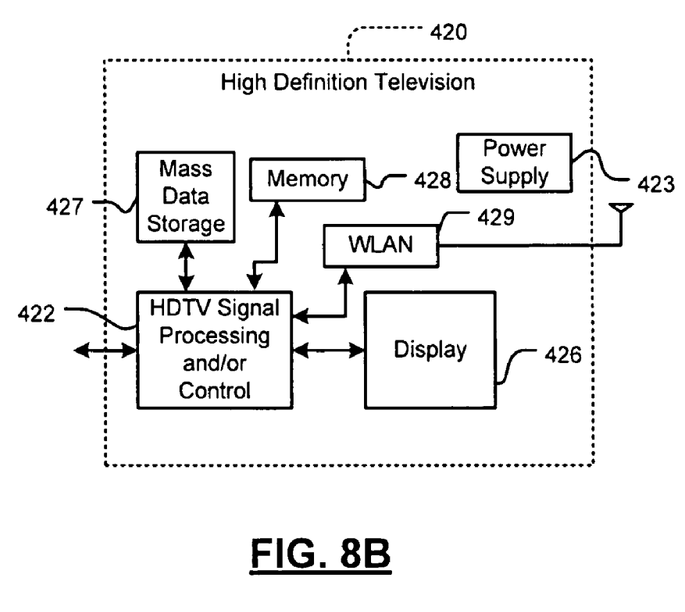
FIG. 8B is a functional block diagram of a high definition television.

Referring now to FIG. 8B, the error correction system can be implemented in a high definition television (HDTV) 420. The HDTV 420 includes either or both signal processing and/or control circuit, which are generally identified in FIG. 9B at 422, a WLAN interface 429, mass data storage 627, and/or a power supply 423. The mass data storage 427 may implement the error correction system. For example, the mass data storage 427 may include one or more buffer memories that temporarily store data that is transmitted to and from the HDTV 420. The memory controller module that manages the buffer memories may implement the error correction system. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices including, but not limited to, DVD drives and HDDs. At least one HDD may have the configuration shown in FIG. 1 and/or at least one DVD drive may have the configuration shown in FIG. 8A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with the WLAN via the WLAN interface 429.

Figure 8C:
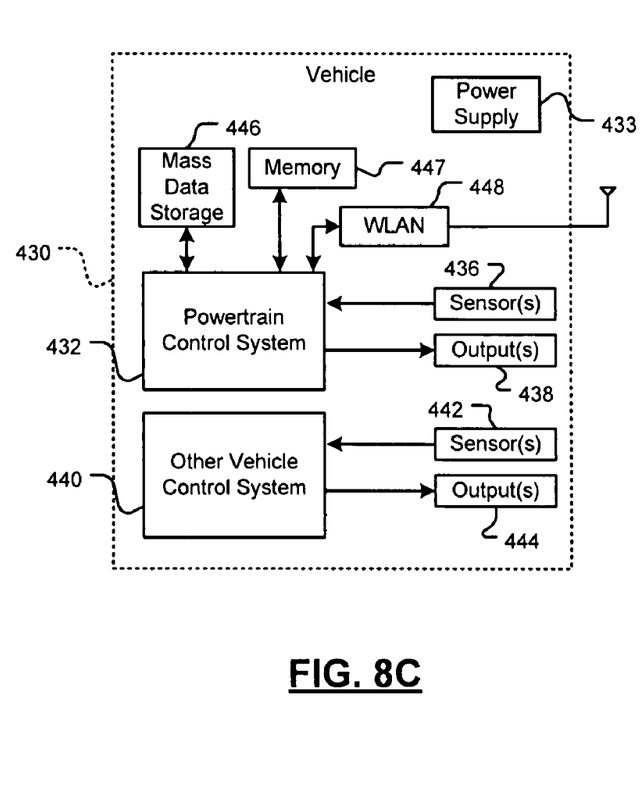
FIG. 8C is a functional block diagram of a vehicle control system.

Referring now to FIG. 8C, the vehicle 430 includes a powertrain control system 432, a WLAN interface 448, mass data storage 446 and/or a power supply 433. The mass data storage 446 may implement the error correction system. For example, the mass data storage 446 may include one or more buffer memories that temporarily store data that is transmitted to and from the powertrain control system 432. The memory controller module that manages the buffer memories may implement the error correction system. In some implementations, the powertrain control system 432 receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The error correction system may also be implemented in an other vehicle control system 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc system and the like. Still other implementations are contemplated.

The powertrain control system 432 may communicate with mass data storage 446 that stores data in a nonvolatile manner. The mass data storage 446 may include optical and/or magnetic storage devices such as hard disk drives (HDDs) and/or DVD drives. At least one HDD may have the configuration shown in FIG. 1 and/or at least one DVD drive may have the configuration shown in FIG. 8A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via the WLAN interface 448. The control system 440 may also include mass data storage, memory and/or a WLAN interface (all not shown).

Figure 8D:
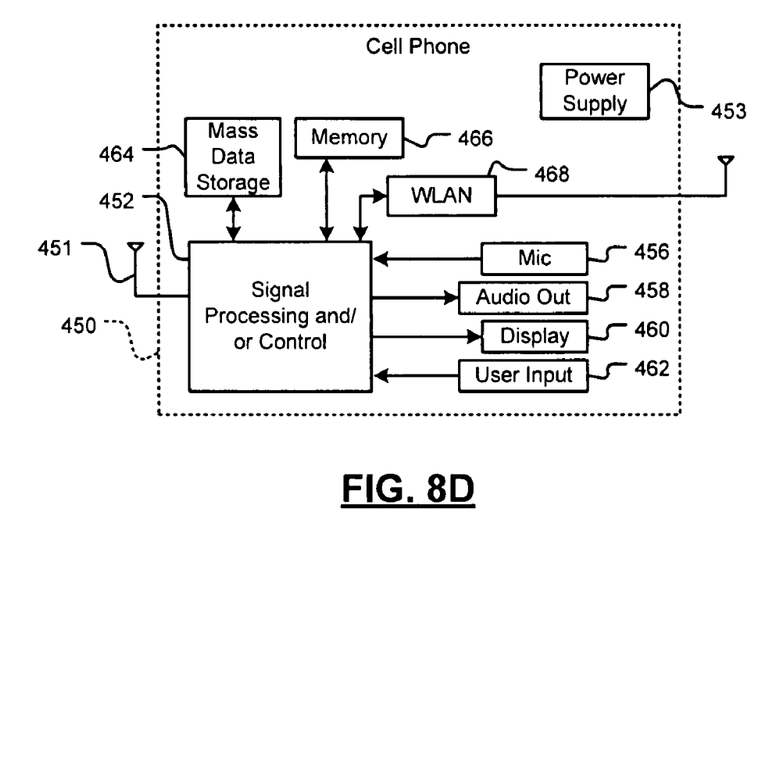
FIG. 8D is a functional block diagram of a cellular phone.

Referring now to FIG. 8D, the error correction system can be implemented in a cellular phone 450 that may include a cellular antenna 451. The cellular phone 450 includes either or both signal processing and/or control circuit, which are generally identified in FIG. 8D at 452, a WLAN interface 468, mass data storage 464 and/or a power supply 453. The mass data storage 464 of the cellular phone 450 may implement the error correction system. For example, the mass data storage 464 may include one or more buffer memories that temporarily store data that is transmitted to and from the cellular phone 450. The memory controller module that manages the buffer memories may implement the error correction system. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuit 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices including hard disk drives (HDDs) and/or DVD drives. At least one HDD may have the configuration shown in FIG. 1 and/or at least one DVD drive may have the configuration shown in FIG. 8A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via the WLAN interface 468.

Figure 8E:
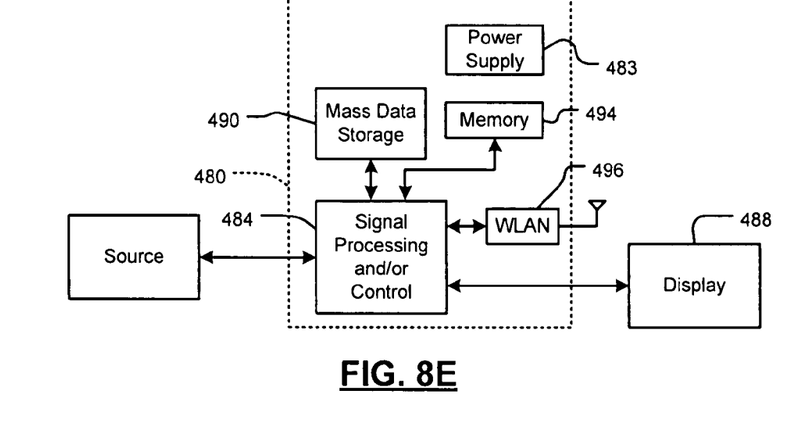
FIG. 8E is a functional block diagram of a set top box.

Referring now to FIG. 8E, the error correction system can be implemented in a set top box 480. The set top box 480 includes either or both signal processing and/or control circuit, which are generally identified in FIG. 9E at 484, a WLAN interface 496, mass data storage 490 and/or a power supply 483. The mass data storage 490 of the set top box 480 may implement the error correction system. For example, the mass data storage 490 may include one or more buffer memories that temporarily store data that is transmitted to and from the set top box 480. The memory controller module that manages the buffer memories may implement the error correction system. The set top box 480 receives signals from a source such as a broadband source and outputs standard and/or high definition audio/video signals suitable for a display 488 such as a television, a monitor and/or other video and/or audio output devices. The signal processing and/or control circuit 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as hard disk drives (HDDs) and/or DVD drives. At least one HDD may have the configuration shown in FIG. 1 and/or at least one DVD drive may have the configuration shown in FIG. 8A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via the WLAN interface 496.

Figure 8F:
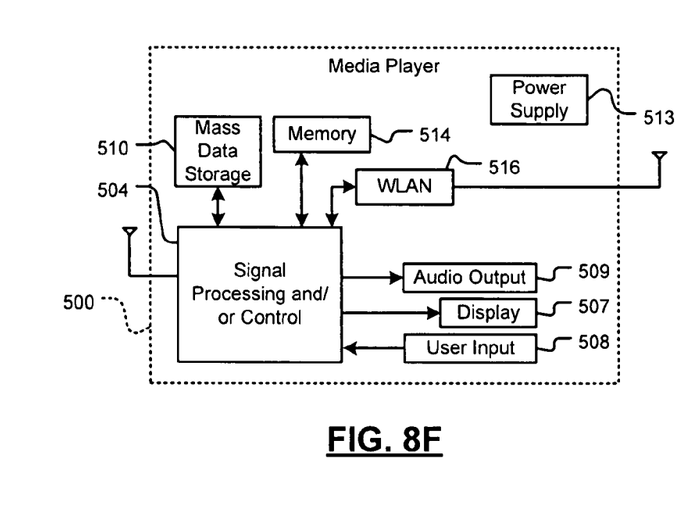
FIG. 8F is a functional block diagram of a media player.

Referring now to FIG. 8F, the error correction system can be implemented in a media player 500. The media player 500 includes either or both signal processing and/or control circuit, which are generally identified in FIG. 8F at 504, a WLAN interface 516, mass data storage 510 and/or a power supply 513. The mass data storage 510 of the media player 500 may implement the error correction system. For example, the mass data storage 510 may include one or more buffer memories that temporarily store data that is transmitted to and from the media player 500. The memory controller module that manages the buffer memories may implement the error correction system. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuit 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices such as hard disk drives (HDDs) and/or DVD drives. At least one HDD may have the configuration shown in FIG. 1 and/or at least one DVD drive may have the configuration shown in FIG. 8A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via the WLAN interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An error correction system for a data storage device, the error correction system comprising:
   a direct access module
      to receive a data stream including a plurality of data words from a host,
      to generate data integrity information based on said plurality of data words, and
      to insert said data integrity information into said data stream; and
   a buffer control module to receive said data stream from said direct access module and to store said data stream to a memory,
      wherein said direct access module is connected between said host and said buffer control module.

2. The error correction system of claim 1 wherein said direct access module generates said data integrity information for at least one of said data words.

3. The error correction system of claim 1 wherein said direct access module receives said plurality of data words from said host when said host asserts at least one of a plurality of control signals.

4. The error correction system of claim 3 wherein said plurality of control signals includes at least one of a host request signal, an address signal, a data signal, a write signal, and a host masking signal.

5. The error correction system of claim 1 wherein said direct access module selectively operates in at least one of an activated mode and a deactivated mode.

6. The error correction system of claim 5 wherein said direct access module generates said data integrity information based on said plurality of data words, and inserts said data integrity information into said data stream when said direct access module operates in said activated mode.

7. The error correction system of claim 5 wherein said direct access module receives said plurality of data words from said host and transmits said plurality of data words to said buffer control module when said direct access module operates in said deactivated mode.

8. The error correction system of claim 1 wherein said direct access module receives said data stream previously stored in said memory from said buffer control module and checks for one or more errors in said data stream based on said data integrity information.

9. The error correction system of claim 8 wherein said direct access module corrects at least one of said one or more errors and transmits a corrected error signal to said host.

10. The error correction system of claim 8 wherein said direct access module determines that at least one of said one or more errors is uncorrectable and transmits an uncorrectable error signal to said host.

11. The error correction system of claim 10 wherein said direct access module transmits at least one of said data words that corresponds to said at least one of said one or more errors to said host.

12. The error correction system of claim 8 wherein said direct access module receives said data stream from said buffer control module when said host asserts at least one of a plurality of control signals.

13. The error correction system of claim 12 wherein said plurality of control signals includes at least one of a host request signal, an address signal, and a host masking signal.

14. The error correction system of claim 8 wherein said direct access module removes said data integrity information from said data stream and transmits said data stream to said host.

15. The error correction system of claim 8 wherein said direct access module transmits said data stream to said host.

16. The error correction system of claim 1 wherein said data integrity information is at least one of an error correction code (ECC) and a cyclic redundancy check (CRC).

17. The error correction system of claim 1 wherein said memory is a buffer that temporarily stores said data stream, said data stream to be subsequently transmitted between said buffer control module and a storage device.

18. The error correction system of claim 17 further comprising:
a data integrity module that receives said data stream from said buffer, that generates second data integrity information based on said data stream, and that inserts said second data integrity information into said data stream, wherein said data stream including said second data integrity information is transferred to said storage device.

19. A hard disk drive that includes said error correction system of claim 1.

20. An error correction system for a data storage device, the error correction system comprising:
direct access means
for receiving a data stream that includes a plurality of data words from a host,
for generating data integrity information based on said plurality of data words, and
for inserting said data integrity information into said data stream; and
buffer control means for receiving said data stream from said direct access means and storing said data stream to a memory means,
wherein said direct access means is connected between said host and said buffer control means.

21. The error correction system of claim 20 wherein said direct access means generates said data integrity information for at least one of said data words.

22. The error correction system of claim 20 wherein said direct access means receives said plurality of data words from said host when said host asserts at least one of a plurality of control signals.

23. The error correction system of claim 22 wherein said plurality of control signals includes at least one of a host request signal, an address signal, a data signal, a write signal, and a host masking signal.

24. The error correction system of claim 20 wherein said direct access means selectively operates in at least one of an activated mode and a deactivated mode.

25. The error correction system of claim 24 wherein said direct access means generates said data integrity information based on said plurality of data words, and inserts said data integrity information into said data stream when said direct access means operates in said activated mode.

26. The error correction system of claim 24 wherein said direct access means receives said plurality of data words from said host and transmits said plurality of data words to said buffer control means when said direct access means operates in said deactivated mode.

27. The error correction system of claim 20 wherein said direct access means receives said data stream previously stored in said memory means from said buffer control means and checks for one or more errors in said data stream based on said data integrity information.

28. The error correction system of claim 27 wherein said direct access means corrects at least one of said one or more errors and transmits a corrected error signal to said host.

29. The error correction system of claim 27 wherein said direct access means determines that at least one of said one or more errors is uncorrectable and transmits an uncorrectable error signal to said host.

30. The error correction system of claim 29 wherein said direct access means transmits at least one of said data words that corresponds to said at least one of said one or more errors to said host.

31. The error correction system of claim 27 wherein said direct access means receives said data stream from said buffer control means when said host asserts at least one of a plurality of control signals.

32. The error correction system of claim 31 wherein said plurality of control signals includes at least one of a host request signal, an address signal, and a host masking signal.

33. The error correction system of claim 27 wherein said direct access means removes said data integrity information from said data stream and transmits said data stream to said host.

34. The error correction system of claim 27 wherein said direct access means transmits said data stream to said host.

35. The error correction system of claim 20 wherein said data integrity information is at least one of an error correction code (ECC) and a cyclic redundancy check (CRC).

36. The error correction system of claim 20 wherein said memory means temporarily stores said data stream, said data stream to be subsequently transmitted between said buffer control means and a storage device means.

37. The error correction system of claim 36 further comprising:
data integrity means for receiving said data stream from said buffer means, for generating second data integrity information based on said data stream, and for inserting said second data integrity information into said data stream, wherein said data stream including said second data integrity information is transferred to said storage device means.

38. A hard disk drive that includes said error correction system of claim 20.

39. An error correction method for a data storage device, the error correction method comprising:
receiving a data stream that includes a plurality of data words at a direct access module from a host, generating data integrity information using said direct access module based on said plurality of data words, inserting said data integrity information into said data stream with said direct access module, and transmitting said data stream from said direct access module to a buffer control module; and
storing said data stream to a buffer memory,
wherein said direct access module is connected between said host and said buffer control module.

40. The error correction method of claim 39 further comprising generating said data integrity information for at least one of said data words.

41. The error correction method of claim 39 further comprising receiving said plurality of data words from said host when said host asserts at least one of a plurality of control signals.

42. The error correction method of claim 41 wherein said plurality of control signals includes at least one of a host request signal, an address signal, a data signal, a write signal, and a host masking signal.

43. The error correction method of claim 39 further comprising receiving a data stream that includes a plurality of data words from a host, generating data integrity information based on said plurality of data words, inserting said data integrity information into said data stream, and transmitting said data stream to said buffer control module based on operating in at least one of an activated mode and a deactivated mode.

44. The error correction method of claim 43 further comprising generating said data integrity information based on said plurality of data words, and inserting said data integrity information into said data stream when operating in said activated mode.

45. The error correction method of claim 43 further comprising receiving said plurality of data words from said host, and transmitting said plurality of data words to said buffer control module when operating in said deactivated mode.

46. The error correction method of claim 39 further comprising receiving said data stream previously stored in said memory and checking for one or more errors in said data stream based on said data integrity information.

47. The error correction method of claim 46 further comprising correcting at least one of said one or more errors and transmitting a corrected error signal to said host.

48. The error correction method of claim 46 further comprising determining that at least one of said one or more errors is uncorrectable, and transmitting an uncorrectable error signal to said host.

49. The error correction method of claim 48 further comprising transmitting at least one of said data words that corresponds to said at least one of said one or more errors to said host.

50. The error correction method of claim 46 further comprising receiving said data stream when said host asserts at least one of a plurality of control signals.

51. The error correction method of claim 50 wherein said plurality of control signals includes at least one of a host request signal, an address signal, and a host masking signal.

52. The error correction method of claim 46 further comprising removing said data integrity information from said data stream, and transmitting said data stream to said host.

53. The error correction method of claim 46 further comprising transmitting said data stream to said host.

54. The error correction method of claim 39 wherein said data integrity information is at least one of an error correction code (ECC) and a cyclic redundancy check (CRC).

55. The error correction method of claim 39 wherein said buffer memory is a buffer that temporarily stores said data stream, said data stream to be subsequently transmitted to a storage device.

56. The error correction method of claim 55 further comprising:
receiving said data stream from said buffer, generating second data integrity information based on said data stream, and inserting said second data integrity information into said data stream, wherein said data stream including said second data integrity information is transferred to said storage device.

57. A hard disk drive that executes said error correction method of claim 39.

* * * * *